April 8, 1930.  D. E. JEWITT  1,754,021
ELECTRIC SHIP PROPULSION SYSTEM
Filed Sept. 2, 1924
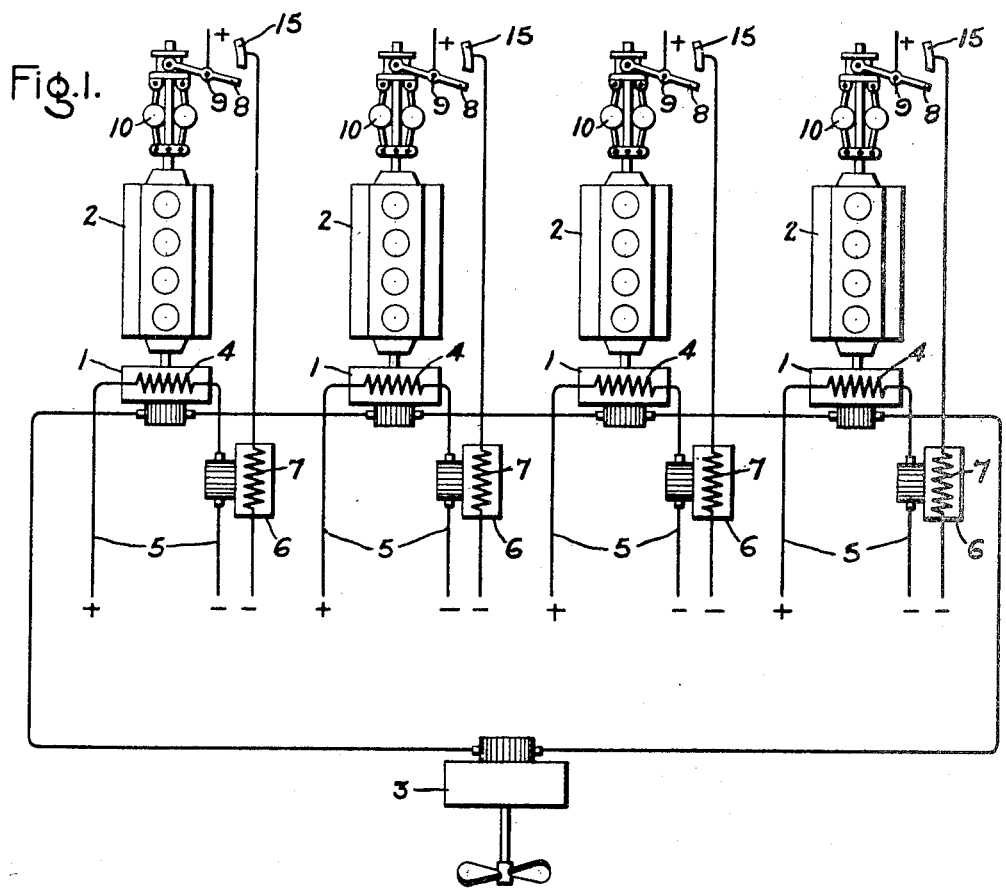
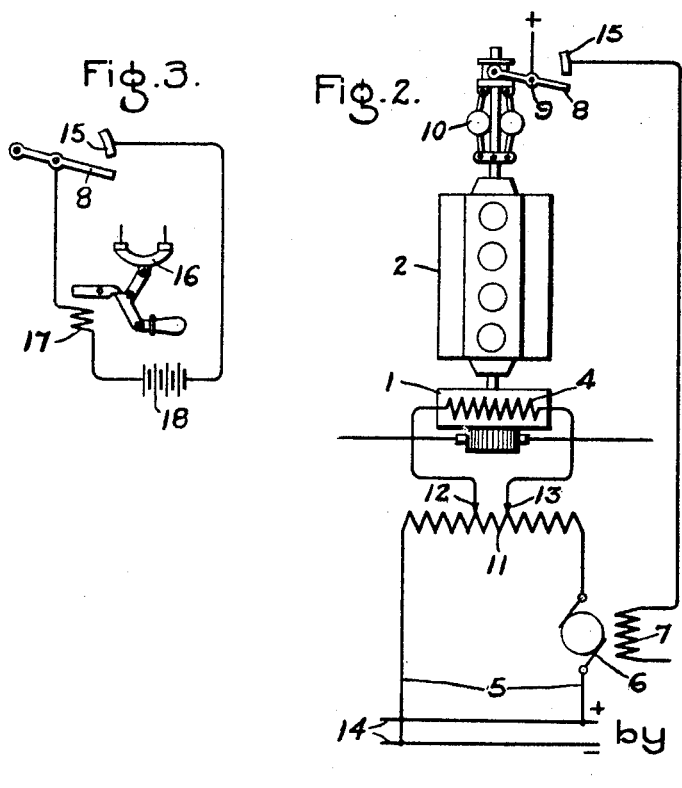
Inventor:
Dennis E. Jewitt,
by
His Attorney.

Patented Apr. 8, 1930

1,754,021

UNITED STATES PATENT OFFICE

DENNIS E. JEWITT, OF OLD BILTON, NEAR RUGBY, ENGLAND, ASSIGNOR TO GENERAL ELECTRIC COMPANY, A CORPORATION OF NEW YORK

ELECTRIC SHIP-PROPULSION SYSTEM

Application filed September 2, 1924, Serial No. 735,281, and in Great Britain November 27, 1923.

My invention relates to ship propulsion systems wherein a plurality of direct current generators each driven by a different prime mover are connected in series for supplying current to one or more propeller motors, and has for its object the provision of a simple and reliable means for preventing stalling or reversal of a generator when the prime mover by which it is driven fails for any reason to exert sufficient torque to drive the generator with its field normally excited.

In the operation of systems of this character, a reduction of the torque exerted by one of the prime movers is apt to produce serious results. Thus, if the prime mover is not stalled, its speed is likely to be so reduced that it is unable to exert the excess torque required to accelerate it to its normal speed, and actual stalling of the prime mover may result in its being driven in the reverse direction by the generator to which it is coupled operating as a motor. Whether the prime mover is decelerated, stalled or driven in the reverse direction, the operation of the system is adversely affected and the power available to drive the propeller is reduced. In accordance with my invention these difficulties are obviated by the provision of means operable in response to a decrease in the prime mover torque and speed for reducing the generator excitation and torque in a manner to permit the prime mover to operate at a reduced torque and speed until it is able to accelerate to its normal speed and torque.

My invention will be better understood from the following description when considered in connection with the accompanying drawing and its scope will be pointed out in the appended claims.

Fig. 1 shows a ship propulsion system in which my invention has been embodied; Fig. 2 shows a modification in the generator field connections; and Fig. 3 shows a modification of the means for controlling the generator excitation.

Fig. 1 shows a plurality of generators 1 which are driven by prime movers 2 and are connected in series for supplying current to a propeller motor 3. The field winding 4 of each generator 1 is arranged to be supplied with current through leads 5 and is connected in series with a booster 6 the field circuit 7 of which is arranged to be made and broken in response to movement of an arm 8 pivoted at 9 and operated by means 10 in response to variation in the speed of the prime mover 1. While a fly ball governor responsive to the prime mover speed has been shown as arranged to operate the arm 8 it will be readily understood that any other suitable means which is responsive to the prime mover torque may be used for this purpose.

Fig. 2 shows an arrangement wherein the generator field winding 4, instead of being connected directly in series with the booster 6, is connected to a potentiometer 11 through adjustable contacts 12 and 13. The potentiometer 11 may be connected to a source of current through leads 14 and the booster 6. This arrangement facilitates the adjustment of the generator field excitation.

In the arrangements of both the figures, the arm 8 is arranged to cooperate with a contact segment 15 which is of a shape adapted to maintain the field circuit of the booster closed when the prime mover is operated at a speed sufficient to supply enough torque for driving the generator with its field fully excited. When the prime mover torque decreases and the prime mover speed is reduced to a value predetermined by the setting of the governor, the booster field circuit is interrupted thereby reducing the generator excitation and permitting the prime mover to operate with reduced torque. While the contact member is shown as a solid segment of conductive material it may obviously be replaced by a resistor which is controlled by the arm 8 to vary the booster excitation.

Fig. 3 shows a modification wherein a switch 16, instead of the contact members 8 and 15, is arranged to control the excitation of the generator. In this modification, a suitable source shown as a battery 18 is arranged to energize the trip coil 17 of the switch 16 upon engagement of the member 15 and the member 8 which is actuated in accordance with the generator speed and torque. The operation of this arrangement differs from that of those previously described in that the booster field circuit must be closed by hand when it has been caused to open by engagement of the members 8 and 15.

The booster may be driven by any available means such as a separate prime mover, an electric motor or the prime mover of the generator to which it supplies excitation, for example. If the generators 1 are each excited by an exciter which is driven by the corresponding prime mover, it is, of course, possible to connect the booster in the field circuit of the exciter instead of directly in the generator field circuit.

It will be readily understood by those skilled in the art that my invention may be embodied in other forms than those shown and described. I, accordingly, do not wish to be restricted to the exact details of the arrangements shown and described. The terms of the appended claims are, therefore, not limited to the precise arrangements shown but are intended to cover all changes within the true spirit and scope of my invention.

What I claim as new and desire to secure by Letters Patent of the United States, is:—

1. An electric ship propulsion system comprising a plurality of generators connected in series with a propeller motor, a plurality of prime movers respectively driving said generators, an exciting circuit for each generator arranged to be connected to a source of supply, and means arranged to be affected by the difference in the torques exerted by a generator and its corresponding prime mover for decreasing the excitation of said generator independently of the voltage of the source of supply when the torque of said generator is greater than the torque of its prime mover.

2. An electric ship propulsion system wherein a plurality of generators are connected in series with a propeller motor and wherein each of said generators is arranged to be driven by a different prime mover, comprising a booster for controlling the excitation of each generator, and means for controlling the operation of said booster arranged to be affected by a difference in torque between a generator and its corresponding prime mover to decrease the excitation of said generator when its torque is greater than the torque of its prime mover.

3. An electric power system comprising a plurality of series connected generators each driven by a separate prime mover, and means for preventing stalling of a prime mover comprising centrifugally operated means for reducing the excitation of a generator when the speed of its corresponding prime mover falls below a predetermined value, said excitation reducing means being inoperative to affect the excitation when the speed is above said value.

4. An electric power system comprising a plurality of series connected generators each driven by a separate prime mover, an exciting circuit for each generator, a booster inserted in each exciting circuit for controlling the excitation of the corresponding generator, and means for controlling the operation of said booster in accordance with the speeds of the corresponding prime movers to decrease the excitation of any generator upon a decrease in speed of said generator and its prime mover.

In witness whereof, I have hereunto set my hand this 12th day of August, 1924.

DENNIS E. JEWITT.